(12) United States Patent
Olson et al.

(10) Patent No.: US 7,430,253 B2
(45) Date of Patent: Sep. 30, 2008

(54) METHOD AND APPARATUS FOR INTERFERENCE SUPPRESSION WITH EFFICIENT MATRIX INVERSION IN A DS-CDMA SYSTEM

(75) Inventors: Eric S. Olson, Boulder, CO (US); Anand P. Narayan, Boulder, CO (US); Prashant Jain, Boulder, CO (US); John K. Thomas, Erie, CO (US)

(73) Assignee: TENSORCOMM, Inc, Greenwood Village, CO (US)

( * ) Notice: Subject to any disclaimer, the term of this patent is extended or adjusted under 35 U.S.C. 154(b) by 679 days.

(21) Appl. No.: 10/686,828

(22) Filed: Oct. 15, 2003

(65) Prior Publication Data

US 2004/0136445 A1 Jul. 15, 2004

Related U.S. Application Data

(60) Provisional application No. 60/418,181, filed on Oct. 15, 2002, provisional application No. 60/418,187, filed on Oct. 15, 2002.

(51) Int. Cl.
 *H04L 27/00* (2006.01)
(52) U.S. Cl. ...................................... 375/316
(58) Field of Classification Search ................. 375/142, 375/143, 144, 148, 150, 152, 316, 343, 346; 370/320, 335, 342, 441
See application file for complete search history.

(56) References Cited

U.S. PATENT DOCUMENTS

| | | | |
|---|---|---|---|
| 3,742,201 A | 6/1973 | Groginsky | |
| 4,088,955 A | 5/1978 | Baghdady | |
| 4,309,769 A | 1/1982 | Taylor, Jr. | |
| 4,359,738 A | 11/1982 | Lewis | |
| 4,601,046 A | 7/1986 | Halpern | |
| 4,665,401 A | 5/1987 | Garrard et al. | |
| 4,670,885 A | 6/1987 | Parl et al. | |
| 4,713,794 A | 12/1987 | Byington et al. | |
| 4,780,885 A | 10/1988 | Paul et al. | |

(Continued)

FOREIGN PATENT DOCUMENTS

| | | |
|---|---|---|
| DE | 4201439 A1 | 7/1993 |
| DE | 4326843 A1 | 2/1995 |
| DE | 4343959 A1 | 6/1995 |
| EP | 0558910 A1 | 1/1993 |
| EP | 0610989 A2 | 1/1994 |

(Continued)

OTHER PUBLICATIONS

Mitra, et al., Adaptive Decorrelating Detectors for CDMA Systems, Accepted for Wireless Communications Journal, Accepted May 1995.

(Continued)

*Primary Examiner*—Sam K Ahn
(74) *Attorney, Agent, or Firm*—Anand P. Narayan

(57) ABSTRACT

The present invention is directed to signal cancellation in spread spectrum communication systems. In particular, the present invention provides method and apparatus for selectively canceling interfering signals, even where symbols to be canceled do not align with symbols associated with a desired signal path. Furthermore, the interference cancellation provided by embodiments of the present invention is capable of functioning to remove interference associated with channels utilizing a symbol length that is different than the symbol length of a desired signal path. In accordance with a further embodiment of the present invention, method and apparatus for efficiently calculating projections to enable signal cancellation are provided.

30 Claims, 8 Drawing Sheets

U.S. PATENT DOCUMENTS

| | | | |
|---|---|---|---|
| 4,856,025 A | 8/1989 | Takai |
| 4,893,316 A | 1/1990 | Janc et al. |
| 4,922,506 A | 5/1990 | McCallister et al. |
| 4,933,639 A | 6/1990 | Barker |
| 4,965,732 A | 10/1990 | Roy, III et al. |
| 5,017,929 A | 5/1991 | Tsuda |
| 5,099,493 A | 3/1992 | Zeger et al. |
| 5,105,435 A | 4/1992 | Stilwell |
| 5,109,390 A | 4/1992 | Gilhousen et al. |
| 5,119,401 A | 6/1992 | Tsujimoto |
| 5,136,296 A | 8/1992 | Roettger et al. |
| 5,151,919 A | 9/1992 | Dent |
| 5,218,359 A | 6/1993 | Minamisono |
| 5,218,619 A | 6/1993 | Dent |
| 5,220,687 A | 6/1993 | Ichikawa et al. |
| 5,224,122 A | 6/1993 | Bruckert |
| 5,237,586 A | 8/1993 | Bottomley |
| 5,263,191 A | 11/1993 | Dickerson |
| 5,280,472 A | 1/1994 | Gilhousen et al. |
| 5,305,349 A | 4/1994 | Dent |
| 5,325,394 A | 6/1994 | Bruckert |
| 5,343,493 A | 8/1994 | Karimullah |
| 5,343,496 A | 8/1994 | Honig et al. |
| 5,347,535 A | 9/1994 | Karasawa et al. |
| 5,353,302 A | 10/1994 | Bi |
| 5,377,183 A | 12/1994 | Dent |
| 5,386,202 A | 1/1995 | Cochran et al. |
| 5,390,207 A | 2/1995 | Fenton et al. |
| 5,394,110 A | 2/1995 | Mizoguchi |
| 5,396,256 A | 3/1995 | Chiba et al. |
| 5,437,055 A | 7/1995 | Wheatley, III |
| 5,440,265 A | 8/1995 | Cochran et al. |
| 5,448,600 A | 9/1995 | Lucas |
| 5,481,570 A | 1/1996 | Winters |
| 5,506,865 A | 4/1996 | Weaver, Jr. |
| 5,513,176 A | 4/1996 | Dean et al. |
| 5,533,011 A | 7/1996 | Dean et al. |
| 5,553,098 A | 9/1996 | Cochran et al. |
| 5,602,833 A | 2/1997 | Zehavi |
| 5,644,592 A | 7/1997 | Divsalar |
| 5,736,964 A | 4/1998 | Ghosh et al. |
| 5,787,130 A | 7/1998 | Kotzin et al. |
| 5,844,521 A | 12/1998 | Stephens et al. |
| 5,859,613 A | 1/1999 | Otto |
| 5,872,540 A | 2/1999 | Casabona |
| 5,872,776 A | 2/1999 | Yang |
| 5,894,500 A | 4/1999 | Bruckert et al. |
| 5,926,761 A | 7/1999 | Reed et al. |
| 5,930,229 A | 7/1999 | Yoshida et al. |
| 5,953,369 A | 9/1999 | Suzuki |
| 5,978,413 A | 11/1999 | Bender |
| 5,995,499 A | 11/1999 | Hottinen et al. |
| 6,002,727 A | 12/1999 | Uesugi |
| 6,014,373 A | 1/2000 | Schilling et al. |
| 6,018,317 A | 1/2000 | Dogan et al. |
| 6,032,056 A | 2/2000 | Reudink |
| 6,088,383 A | 7/2000 | Suzuki et al. |
| 6,101,385 A | 8/2000 | Monte et al. |
| 6,104,712 A | 8/2000 | Robert et al. |
| 6,115,409 A | 9/2000 | Upadhyay et al. |
| 6,127,973 A | 10/2000 | Choi et al. |
| 6,131,013 A | 10/2000 | Bergstrom et al. |
| 6,137,788 A | 10/2000 | Sawahashi et al. |
| 6,141,332 A | 10/2000 | Lavean |
| 6,154,443 A | 11/2000 | Huang et al. |
| 6,157,685 A | 12/2000 | Tanaka et al. |
| 6,157,842 A | 12/2000 | Kaisson et al. |
| 6,157,847 A | 12/2000 | Buehrer et al. |
| 6,163,696 A | 12/2000 | Bi et al. |
| 6,166,690 A | 12/2000 | Lin et al. |
| 6,172,969 B1 | 1/2001 | Kawakami et al. |
| 6,175,587 B1 | 1/2001 | Madhow et al. |
| 6,192,067 B1 | 2/2001 | Toda et al. |
| 6,201,799 B1 | 3/2001 | Huang et al. |
| 6,215,812 B1 | 4/2001 | Young et al. |
| 6,219,376 B1 | 4/2001 | Zhodzishsky et al. |
| 6,222,828 B1 | 4/2001 | Ohlson et al. |
| 6,230,180 B1 | 5/2001 | Mohamed |
| 6,233,229 B1 | 5/2001 | Ranta et al. |
| 6,233,459 B1 | 5/2001 | Sullivan et al. |
| 6,240,124 B1 | 5/2001 | Wiedeman et al. |
| 6,252,535 B1 | 6/2001 | Kober et al. |
| 6,256,336 B1 | 7/2001 | Rademacher et al. |
| 6,259,688 B1 | 7/2001 | Schilling et al. |
| 6,263,208 B1 | 7/2001 | Chang et al. |
| 6,266,529 B1 | 7/2001 | Chheda |
| 6,275,186 B1 | 8/2001 | Kong |
| 6,278,726 B1 | 8/2001 | Mesecher et al. |
| 6,282,231 B1 | 8/2001 | Norman et al. |
| 6,282,233 B1 | 8/2001 | Yoshida |
| 6,285,316 B1 | 9/2001 | Nir et al. |
| 6,285,319 B1 | 9/2001 | Rose |
| 6,285,861 B1 | 9/2001 | Bonaccorso et al. |
| 6,301,289 B1 | 10/2001 | Bejjani et al. |
| 6,304,618 B1 | 10/2001 | Hafeez et al. |
| 6,308,072 B1 | 10/2001 | Labedz et al. |
| 6,310,704 B1 | 10/2001 | Dogan et al. |
| 6,317,453 B1 | 11/2001 | Chang |
| 6,321,090 B1 | 11/2001 | Soliman |
| 6,324,159 B1 | 11/2001 | Mennekens et al. |
| 6,327,471 B1 | 12/2001 | Song |
| 6,330,460 B1 | 12/2001 | Wong et al. |
| 6,333,947 B1 | 12/2001 | van Heeswyk et al. |
| 6,351,235 B1 | 2/2002 | Stilp |
| 6,351,642 B1 | 2/2002 | Corbett et al. |
| 6,359,874 B1 | 3/2002 | Dent |
| 6,362,760 B2 | 3/2002 | Kober et al. |
| 6,363,104 B1 | 3/2002 | Bottomley |
| 6,377,636 B1 | 4/2002 | Paulraj et al. |
| 6,380,879 B2 | 4/2002 | Kober et al. |
| 6,385,264 B1 | 5/2002 | Terasawa |
| 6,396,804 B2 | 5/2002 | Odenwalder |
| 6,404,760 B1 | 6/2002 | Holtzman et al. |
| 6,430,216 B1 | 8/2002 | Kober et al. |
| 6,459,693 B1 | 10/2002 | Park et al. |
| 6,501,788 B1 | 12/2002 | Wang |
| 6,515,980 B1 | 2/2003 | Bottomley |
| 6,570,909 B1 | 5/2003 | Kansakoski |
| 6,574,270 B1 | 6/2003 | Madkour |
| 6,580,771 B2 | 6/2003 | Kenney |
| 6,584,115 B1 | 6/2003 | Suzuki |
| 6,590,888 B1 | 7/2003 | Ohshima |
| 6,680,727 B2 | 1/2004 | Butler |
| 6,798,737 B1 | 9/2004 | Dabak |
| 6,801,565 B1 | 10/2004 | Bottomley |
| 2001/0003443 A1 | 6/2001 | Velazquez et al. |
| 2001/0020912 A1 | 9/2001 | Naruse et al. |
| 2001/0021646 A1 | 9/2001 | Antonucci et al. |
| 2001/0046266 A1 | 11/2001 | Rakib et al. |
| 2002/0001299 A1 | 1/2002 | Petch et al. |
| 2002/0051433 A1 | 5/2002 | Affes et al. |
| 2002/0172173 A1 | 11/2002 | Schilling et al. |
| 2002/0176488 A1 | 11/2002 | Kober et al. |
| 2003/0053526 A1 | 3/2003 | Reznik |

FOREIGN PATENT DOCUMENTS

| | | |
|---|---|---|
| GB | 2280575 A | 2/1995 |
| JP | 2000-13360 A | 1/2000 |

| WO | WO 93/12590 | 6/1995 |

OTHER PUBLICATIONS

Schneider, Optimum Detection of Code Division Multiplexed Signals, IEEE Transactions on Aerospace and Electronic Systems, Jan. 1979, vol. AES-15 No. 1.

Mitra, et al., Adaptive Receiver Algorithms for Near-Far Resistant CDMA, IEEE Transactions of Communications, Apr. 1995.

Lupas, et al. Near-Far Resistance of Multiuser Detectors in Asynchronous Channels, IEEE Transactions on Communications, Apr. 1990, vol. 38, No. 4.

Lupas, et al., Linear Multiuser Detectors for Synchronous Code-Division Multiple-Access Channels, IEEE Transactions on Information Theory, Jan. 1989, vol. 35, No. 1.

Kohno, et al., Cancellation Techniques of Co-Channel Interference in Asynchronous Spread Spectrum Multiple Access Systems, May 1983, vol. J 56-A. No. 5.

Garg et al., Wireless and Personal Communications Systems, 1996, pp. 79-151, Prentice Hall, Upper Saddle River, NJ, US.

Cheng, et al., Spread-Spectrum Code Acquisition in the Presence of Doppler Shift and Data Modulation, IEEE Transactions on Communications, Feb. 1990, vol. 38, No. 2.

Behrens et al., Parameter Estimation in the Presence of Low Rank Nosie, pp. 341-344, Maple Press, 1988.

Best, Phase-Locked Loops—Design, Simulation, and Applications, pp. 251-287, McGraw-Hill, 1999.

Iltis, Multiuser Detection of Quasisynchronous CDMA Signals Using Linear Decorrelators, IEEE Transactions on Communications, Nov. 1996, vol. 44, No. 11.

Rappaport, Wireless Communications—Principles & Practice, 1996, pp. 518-533, Prentice Hall, Upper Saddle River, NJ, US.

Scharf, et al., Matched Subspace Detectors, IEEE Transactions on Signal Processing, Aug. 1994, vol. 42, No. 8.

Price et al., A Communication Technique for Multipath Channels, Proceedings to the IRE, 1958, vol. 46, The Institute of Radio Engineers, New York, NY, US.

Affes et al., Interference Subspace Rejection: A Framework for Multiuser Detection in Wideband CDMA, IEEE Journal on Selected Areas in Communications, Feb. 2002, vol. 20, No. 2.

Schlegel et al., Coded Asynchronous CDMA and Its Efficient Detection, IEEE Transactions on Information Theory, Nov. 1998, vol. 44, No. 7.

Xie et al., A family of Suboptimum Detectors for Coherent Multiuser Communications, IEEE Journal on Selected Areas in Communications, May 1990, vol. 8, No. 4.

Viterbi, Very Low Rate Convolutional Codes for Maximum Theoretical Performance of Spread Spectrum Multiple-Access Channels, IEEE Journal of Selected Areas in Communications, May 1990, vol. 8, No. 4.

Viterbi, CDMA—Principles of Spread Spectrum Communication, 1995, pp. 11-75 and 179-233, Addison-Wesley, Reading, MA, US.

Verdu, Mimimum Probability of Error for Asynchronous Gaussian Multiple-Access Channels, IEEE Transactions on Information Theory, Jan. 1986, vol. IT-32, No. 1.

Kaplan, Understanding GPS—Principles and Applications, 1996, pp. 83-236, Artech House, Norwood, MA, US.

Scharf, Statistical Signal Processing—Detection, Estimation, and Time Series Analysis, 1990, pp. 23-75 and 103-178, Addison-Wesly, Reading, MA, US.

Stimson, Introduction to Airborne Radar 2nd edition, 1998, pp. 163-176 and 473-491, SciTech Publishing, Mendham, NJ, US.

Behrens, et al., Signal Processing Applications of Oblique Projection Operators, IEEE Transactions on Signal Processing, Jun. 1994, vol. 42, No. 6.

Alexander et al., A Linear Receiver for Coded Multiuser CDMA, IEEE Transactions on Communications, May 1997, vol. 45, No. 5.

Schlegel et al., Multiuser Projection Receivers, IEEE Journal on Selected Areas in Communications, Oct. 1996, vol. 14, No. 8.

Halper et al., Digital-to-Analog Conversio n by Pulse-Count Modulation Methods, IEEE Transactions on Instrumentation and Measurement, Aug. 1996, vol. 45, No. 4.

Ortega et al., Analog to Digital and Digital to Analog Conversion Based on Stochastic Logic, IEEE 0-7803-3026-9/95, 1995.

Frankel et al., High-performance photonic analogue digital converter, Electronic Letters, Dec. 4, 1997, vol. 33, No. 25.

Lin et al., Digital Filters for High Performance Audio Delta-sigma Analog-to-digital and Digital-to-analog Conversions, Proceedings of ICSP, Crystal Semiconductor Corporation, 1996, Austin, TX, US.

Thomas, Thesis for the Doctor of Philosophy Degree, UMI Dissertation Services, Jun. 1996, Ann Arbor, MI, US.

Schlegel et al., Projection Receiver: A New Efficient Multi-User Detector, IEEE, 1995, 0-7803-2509-5/95.

Behrens, Subspace Signal Processing in Structured Noise, UMI Dissertation Services, Jun. 1990, Ann Arbor, MI, US.

METHOD AND APPARATUS FOR INTERFERENCE SUPPRESSION WITH EFFICIENT MATRIX INVERSION IN A DS-CDMA SYSTEM

CROSS-REFERENCE TO RELATED APPLICATIONS

This application claims the benefit of U.S. Provisional Patent Application No. 60/418,181, filed Oct. 15, 2002, and U.S. Provisional Patent Application No. 60/418,187, filed Oct. 15, 2002, the entire disclosures of which are incorporated herein by reference.

FIELD OF THE INVENTION

The present invention relates generally to interference cancellation in communication systems, and more particularly to the construction of an interference matrix as part of an interference cancellation method incorporated into a spread spectrum receiver apparatus. The present invention also relates to matrix inversion and an efficient method for the determination of active channels for cancellation purposes.

BACKGROUND OF THE INVENTION

Wireless communication systems should provide for a large number of secure (or private) communication channels within their allotted frequency space. In order to achieve these goals, spread spectrum systems have been developed. In a spread spectrum type system, spreading codes are used that allow multiple channels to occupy the same frequency range. In order to successfully demodulate a channel, the spreading code and covering code used in connection with the channel must be known. When a demodulation processor is tracking a particular signal path, signal paths associated with other transmitters appear to that processor as noise.

In order to provide for reliable communications, spread spectrum systems typically track multiple signal paths in connection with establishing and maintaining a communication channel between a pair of end points. The different signal paths may result from redundant signals that are provided by additional base stations and base station sectors, or from reflected or multi-path versions of signals. For example, direct sequence code division multiple access (DS-CDMA) communication systems are subject to interference from other DS-CDMA signal sources resulting in signal degradation. This has a deleterious effect on the acquisition, tracking and demodulation of received signals of interest. A system of this type is often described as being interference limited, since strongly interfering signals may create an upper bound on system performance. Therefore, a reduction in interference results in improved processing of the signals of interest and can thus be exploited in terms of increased system capacity, system coverage, data rate or other beneficial system parameters that improve with improved SNR.

Examples of DS-CDMA communication systems include, but are not limited to the forward and reverse links of cdma-One, cdma2000 or WCDMA. In the forward link of cdma2000, a base station transmits a plurality of signals intended for a plurality of mobile stations. The plurality of transmitted signals includes a pilot channel, a paging channel, a synchronization channel and a plurality of traffic channels. Each traffic channel is encoded, and only mobile stations that know the Walsh covering code associated with a particular traffic channel can decode that particular traffic channel. The plurality of encoded channels is then spread by a pseudo-random-noise (PN) sequence across the system bandwidth. Thus, all mobile units simultaneously share the same forward link frequency spectrum and the traffic channels are distinguished by their assigned Walsh codes and short code offsets. DS-CDMA systems use a high chipping rate for the PN code so that where two multipath signals are separated by more than a chip, the two signals appear approximately independent of each other. Most systems use a RAKE receiver architecture to combine two or more received signals to increase the probability of detection and the ability to correctly demodulate the signal. Each finger independently estimates channel gain and phase using the pilot signal to coherently demodulate different copies of the same signal. The traffic symbol estimates are combined in a combiner to provide a better estimate of the transmitted signal.

Typically, the RAKE receiver fingers or demodulation fingers are assigned to the strongest multipath signals, in order to provide the best possible estimates of the transmitted signals. As the mobile unit changes location or the signal environment changes, the channel will typically change and the signals will change ordering, in terms of power, relative to each other. The changes in the channel are due to various factors, including Rayleigh fading, shadow fading, scattering, diffraction and other physical phenomena that alter the path of the signals. The RAKE receiver fingers combine and demodulate the strongest set of multipath fingers. As the set of fingers changes due to fading and other mechanisms, fingers will be de-assigned and others will be assigned, so that the RAKE receiver contains the signal set that can provide the best possible signal estimates.

The encoded channels broadcast by a base station generally do not interfere with one another due to the orthogonality of the covering Walsh codes and the quasi-orthogonality of the covering quasi-orthogonal function (QOF) codes. However, a DS-CDMA receiver is still subject to two forms of multiple access interference on the forward link. Co-channel interference consists of multipath copies of signal paths that are delayed in time with respect to a signal path of interest. In particular, such signals can cause interference because the orthogonality of the Walsh covering codes is lost whenever a time offset exists between two codes. Specifically, when aligned, Walsh codes form an orthogonal basis, but there may be high cross-correlation when they are not aligned. Cross-channel interference occurs when a combination of transmissions from more than one base station sector or base station are received at the RF front-end simultaneously. Each base station sector is distinguished by a unique PN short code offset. The PN sequence has minimal, but nonzero cross-correlation properties. This manifests itself as cross-correlation interference between signals originating from different base station sectors. As a result, a signal transmitted from another base station that is received at a high power level is capable of masking the signal of interest due to the non-zero cross-correlation interference of the short code and the unaligned Walsh codes.

Methods for removing interfering signal paths from received signal streams have been developed. For example, systems that calculate a projection operator from an interference matrix to suppress interference have been developed or proposed. According to one such system, multiple access interferences are ranked, an interference matrix is formed using only left and right overlapping interference reference vectors related to a symbol of a channel of interest and a projection operator constructed with the interference matrix is applied directly to the reference vector, such that interference is suppressed. The projection operator, which projects the reference signal onto a subspace orthogonal to the interference, involves a matrix inverse. A full or pseudo matrix inverse computation is typically required. However, such prior art systems have been incapable of handling communication systems supporting symbols of different lengths. For example, such interference cancellation systems are unable to cancel interference from signal paths in which the interference consists of symbols having lengths that are less than half the length of symbols contained in a desired signal path, because the interference matrix formed using left and right overlapping interference reference vectors cannot span the longer symbol of interest. Accordingly, such systems cannot be applied to recent spread spectrum communication systems, such as CDMA 2000 that support supplemental (short) Walsh covering codes.

With respect to the need for inverting matrices in the calculation of the projection of the reference signal onto a subspace orthogonal to the interference, various methods, commonly referred to as QR methods, have been developed. The QR methods may be used to decompose a given matrix into an orthonormal basis providing a simple matrix inverse operation. For matrix inversions in a projective subspace apparatus, the normalization step is unnecessary. Therefore, such methods introduce computationally expensive and unnecessary steps. Accordingly, prior art interference cancellation systems requiring matrix inversion computations have been computationally inefficient.

SUMMARY OF THE INVENTION

The present invention is directed to addressing these and other problems and disadvantages of the prior art. According to an embodiment of the present invention, a method and apparatus for canceling interfering signals in connection with a spread spectrum communication system are provided. According to another embodiment of the present invention, an interference matrix is formed having more than two interference vectors related to a symbol of a signal path channel of interest. Accordingly, the present invention can be applied to communication systems that support channels having symbols of different lengths. In accordance with a further embodiment of the present invention, a method and apparatus for efficiently inverting a matrix in connection with interference cancellation are provided.

According to an embodiment of the present invention, a signal path selected for cancellation from a signal stream carrying a desired signal path is identified. An interference matrix is then constructed representing the interfering signal path(s). The interference matrix includes a number of interference vectors for each symbol of a signal path channel to be canceled, and is particularly applicable in connection with interfering signal paths having symbol boundaries that are not aligned with the symbol boundaries of a desired signal path. Without loss of generality, the first and last vectors correspond to partial symbols and the interior vectors to a complete symbol or symbols included in an interfering signal path of independently modulated symbols that overlap the symbol of interest in time. All of the vectors of the interference matrix contain nonzero values such that the sum of the non-zero values of the interference vectors is equal to the length of the symbol of interest. More particularly, if the symbols within the interfering signal path channel are x chips long, and the first interference vector has z nonzero chips (i.e., z chips of a first symbol in the interfering signal path overlap with chips included in a first symbol transmitted by the desired signal path), the last interference vector will contain x-z nonzero chip values. In accordance with another embodiment of the present invention, the interference matrix includes, in general, a number of vectors that is equal to the largest whole number obtained by dividing the number of chips within a symbol included in a symbol transmitted by the desired signal path by the number of chips included in a symbol transmitted by the interfering signal path, plus one. If the interfering symbol length is longer than that of the symbol of interest the number of interference vectors is reduced to a maximum of two. However, note that when symbol alignment occurs or if one interfering symbol completely overlaps the symbol of interest the number of interference vectors may be reduced to one.

In accordance with another embodiment of the present invention, a method and apparatus for efficiently inverting a matrix, such as a matrix produced by performing mathematical operations on an interference matrix for use in connection with an interference cancellation system, is provided. In particular, matrix inversion may be performed using a pseudo inverse in connection with a matrix that is less than full rank. In particular, the basis can be orthogonalized, without requiring a normalization step, resulting in a trivial matrix inversion and computation.

In accordance with another embodiment of the present invention, a Fast Walsh Transform (FWT) for generating reference signals to enable cancellation in connection with different length Walsh codes is provided. Furthermore, the disclosed Fast Walsh Transform can be used in connection with determining active channels.

DETAILED DESCRIPTION

Figure 1:
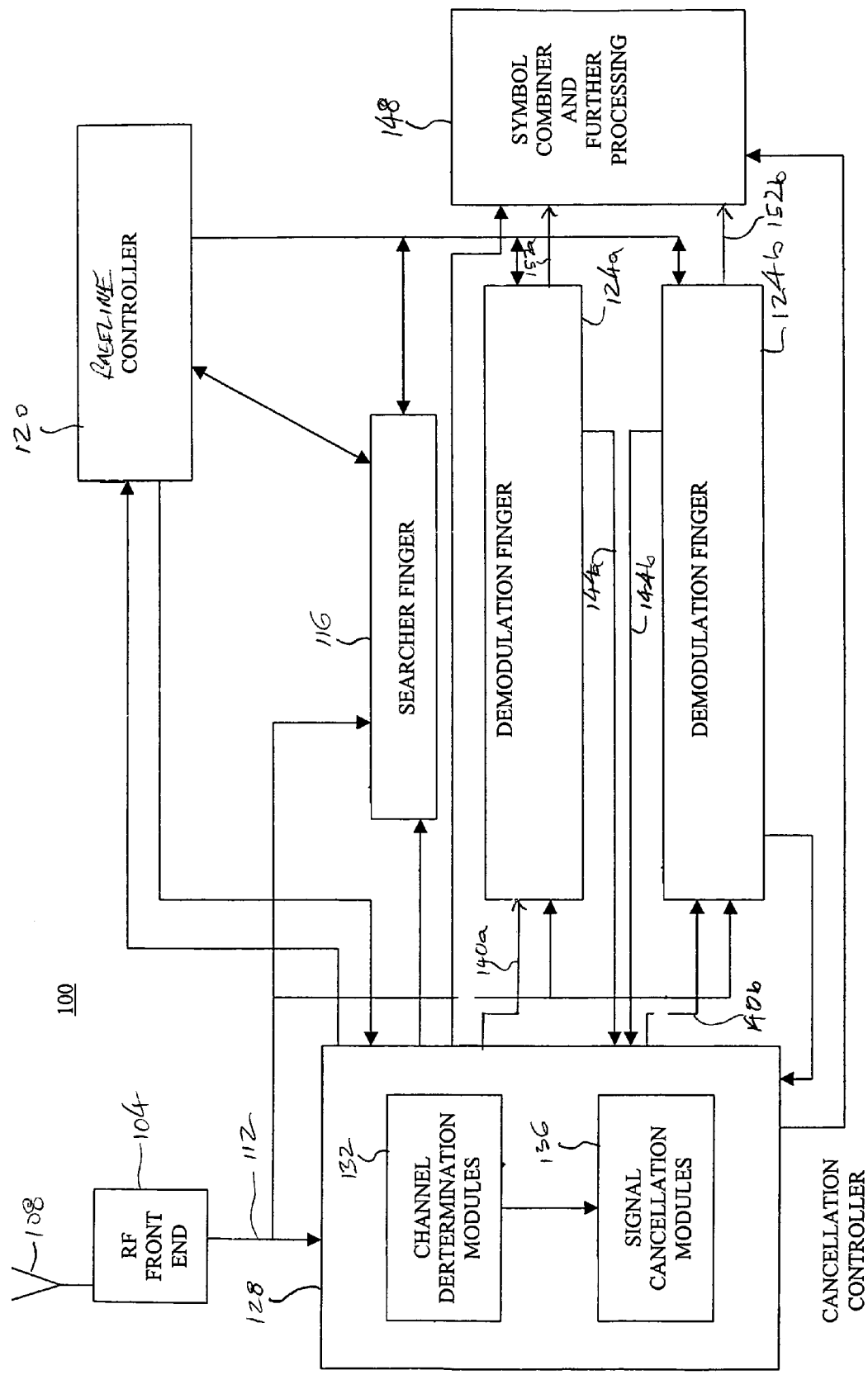
FIG. 1 is a block diagram depicting an interference cancellation-enabled receiver constructed in accordance with an embodiment of the present invention.

A direct sequence code division multiple access (DS-CDMA) communication system includes a plurality of base stations and mobile stations. With reference now to FIG. 1, an interference cancellation enabled receiver 100 in accordance with an embodiment of the present invention is illustrated. As depicted in FIG. 1, signals are provided to a radio frequency front end 104 by an antenna 108. In a typical environment, a number of different signals, for example, signals produced by different base stations, different sectors of a base station, or multipath or reflected versions of the signals can be received at the radio frequency front end 104. As can be appreciated by one of skill in the art, signals from different base stations or different sectors of a base station are typically identified by an associated path number or pseudo-random number (PN) offset, which identifies the base station or base station and sector according to the time offset of the signal path. Multipath versions of signals are identified by the path number relative to the corresponding line of sight version of the signal plus an additional time offset to account for the longer path followed by the reflective signal. As can further be appreciated by one of skill in the art, signal paths from different sources are typically separated by a distance (e.g., an integer multiple of 64 chips) sufficient to allow multipath versions of signal paths to be correctly associated with the appropriate source.

The RF front end 104 down samples the radio frequency signal and separates the signal into a complex baseband signal (or raw signal stream) 112 with in-phase (I) and quadrature (Q) components. It will be recognized by those skilled in the art that the processing depicted and described in connection with the present disclosure includes both the I and Q channels, even when only one connection or signal path is depicted.

The raw signal stream 112 collected by the receiver 100 and down converted by the RF front end 104 is provided to a searcher finger 116. The searcher finger functions to scan the signal stream 112 for individually identifiable signal paths and/or multipath signal paths. In particular, the searcher finger 116 operates to determine the path number or PN code offset associated with each identifiable signal path. As noted above, the PN code identifies the signal path as being associated with a particular base station or base station sector. In code division multiple access (CDMA) systems, the PN code sequence is referred to as the short code and a signal path is identified by a PN code offset.

The searcher finger 116 reports the signal paths that have been identified to the controller 120. The controller 120 may use the information provided from the searcher finger 116 to determine which signal paths to acquire and track. In general, the number of signal paths that a receiver 100 can be directed to track is limited by the number of demodulation fingers 124 provided as part of the receiver 100. In assigning a demodulation finger 124 to acquire and track a signal path, the controller 120 may provide information regarding the PN code offset, any additional time offset associated with the signal path and the observed signal strength for the assigned signal path. In FIG. 1, only two demodulation fingers 124*a* and 124*b* are shown. However, it should be appreciated that any number of additional demodulation fingers 124 may be provided.

As shown in FIG. 1, the baseline controller 120 may be in communication with a cancellation controller 128. As will be described herein, the cancellation controller 128 is capable of providing signal streams to some or all of the demodulation fingers 124 with a corresponding interference cancelled reference vector. In particular, the cancellation controller 128 assigns a demodulation finger 124 to track a signal path of interest. If a signal path that has been acquired and tracked by a finger 124 is interfering with the ability to acquire and track another signal path in another finger 124 (e.g., multipath signals, fingers in soft handoff and fingers not in soft handoff) the cancellation controller 128 can remove the interfering signal path by projecting the reference signal for the signal path of interest onto a subspace orthogonal to the interference. In accordance with the embodiment illustrated in FIG. 1, the cancellation controller 128 includes one or more channel determination modules 132 and one or more signal cancellation modules 136. In general, the channel determination module 132 ranks the interference for each finger and selects the interference to be suppressed or cancelled. The signal cancellation module 136 calculates the projection operator orthogonal to the selected interference. The projection operator 140 may be applied to the reference signal for the channel of interest and provided to a demodulation finger 124 such that data associated with a desired signal path may be demodulated in connection with an interference suppressed reference signal. The resulting demodulated signal path may be provided to the cancellation controller via a cancellation signal line 144, or to the symbol combiner and processor 148 over finger output signal lines 152. The symbol combiner 148 combines the demodulated signal paths provided by the demodulation fingers 124. Accordingly, the symbol combiner 148 and the demodulation fingers 124 may collectively comprise a rake receiver.

As can be appreciated by one of skill in the art, a DS-CDMA communication system typically consists of a plurality of base stations and mobile stations. In general, each base station transmits a plurality of encoded channels at a radio frequency (RF) that is received by the RF front end 104 of a mobile unit's receiver. The received RF signal consists of an RF carrier modulated by a base band signal spread with the short code and Walsh covered, to provide multiple access channelization. In a typical implementation, each base station is distinguished by a short code offset (0-511) with sufficient chip separation to differentiate between signals from different base stations in the vicinity. Each mobile station is assigned a unique Walsh covering code (or traffic channel) by the base station that is orthogonal to all other Walsh codes assigned to other mobile stations. An exception to this is the use of quasi orthogonal functions (QOFs) for covering short code spread signals in certain radio configurations when additional Walsh codes are unavailable, which do have a cross correlation, albeit a minimal cross correlation.

In cdma2000, which is inclusive of the TIA/EIA IS-95 standard, supplemental channels, consisting of shorter length Walsh codes derived from smaller Hadamard matrices, can be assigned by the base station to mobile units for use as high data rate traffic channels. In addition to the assigned traffic channels assigned to the mobile unit, the base station transmits common channels including pilot, paging and synchronization channels. The pilot channel is used for the identification of a CDMA system, for system power estimation, system acquisition and tracking, and coherent demodulation of other channels. The paging channel is used for paging communication with the mobile, typically consisting of call initialization information. The synchronization channel is used for timing synchronization between the base station and the mobile station.

Figure 2:
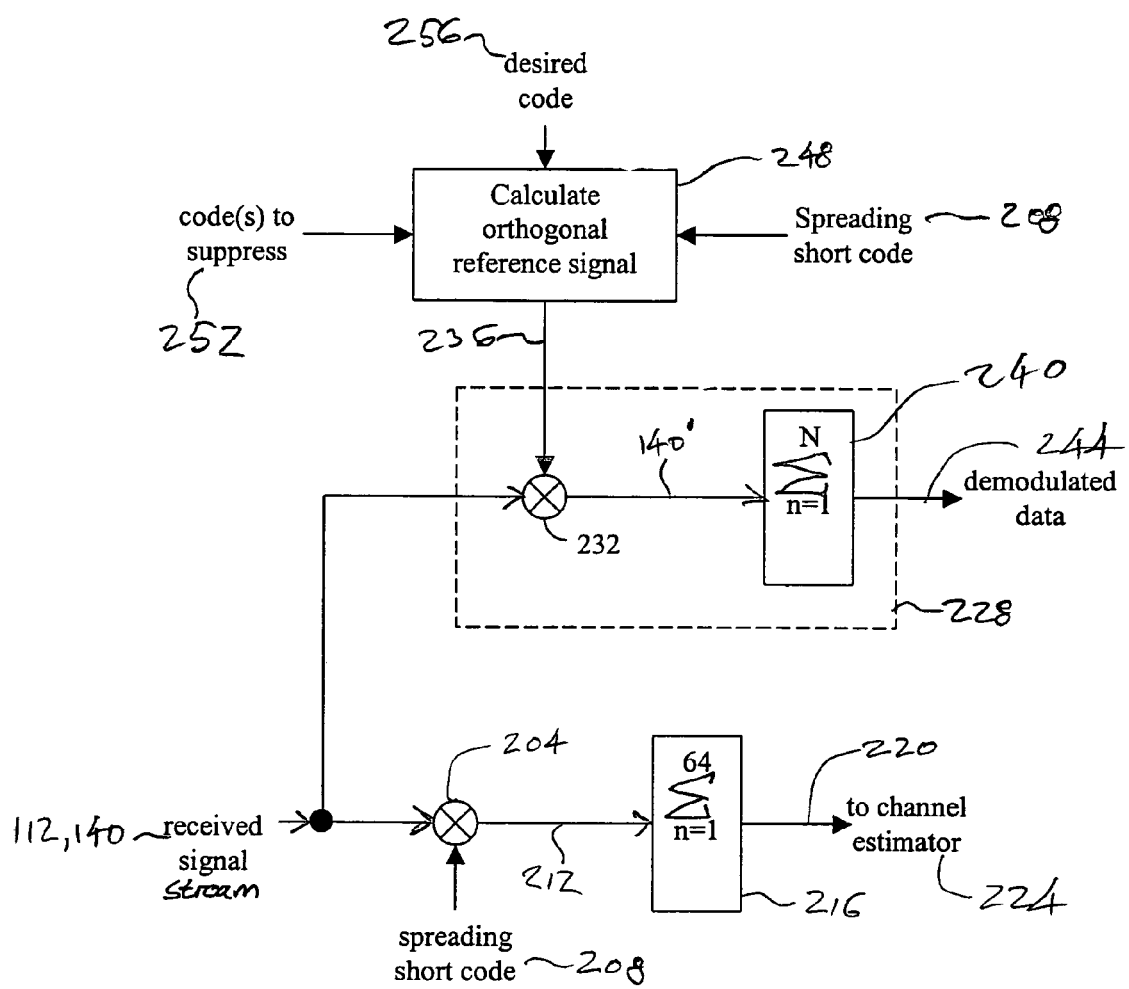
FIG. 2 is a depiction of the interaction between the signal cancellation module and demodulation finger of FIG. 1.

With reference now to FIG. 2, functional aspects of the cancellation controller 128 and demodulation fingers 124 are depicted. In particular, the received signal stream 112 or 140 is despread 204 by the short code 208 associated with a desired signal path. The resulting despread signal 212 is summed over a number of chips corresponding to the chip length of symbols included in the desired signal path by a summer 216. The resulting signal is the pilot channel 220 for the desired signal path, which is Walsh zero. As can be appreciated by one of skill in the art, in connection with a TIA/EIA IS-95 system, this signal path is summed over 64 chips. For CDMA2000 radio configurations that employ longer symbol lengths, the pilot channel will be summed over the appropriate symbol length. The channel estimator 224, which may be implemented as part of the cancellation controller 128, may then determine the gain, phase and other parameters associated with the despread signal 220.

The received signal stream 112 or 140 is also sent to a correlator 228. The correlator 228 may be implemented by a combination of the functions performed by the cancellation controller 128 and the demodulation finger 124 assigned to the received signal stream 112 or 140. In the correlator 228, the received signal stream 112 or 140 is operated on element-wise by a multiplier 232 with a reference signal 236 that is orthogonal to the interference to be suppressed. As will be described in greater detail elsewhere herein, the orthogonal reference signal 236 is produced by projecting a desired code 256 onto a subspace orthogonal to the interference 252 to be canceled. Accordingly, by combining the received signal stream 112 or 140 with the orthogonal reference signal 236, interference from an interfering signal path is removed to provide a despread signal stream 140'. The despread signal stream is then summed over a symbol length in a summer 240 to produce demodulated data 244.

The orthogonal reference signal 236 is calculated in a reference signal calculation module 248. In general, the reference signal calculation module 248 may be implemented as part of or in connection with the cancellation controller 128. The inputs to the reference signal cancellation module 248 include the covering code or codes to suppress 252, the covering code of the desired channel (i.e., the code for the desired channel to be demodulated) 256, and the spreading short code 208, with an offset corresponding to the base station of interest (i.e., the desired signal path). As used herein, it should be appreciated that the term base station may refer to a single base station sector in the case of a communication system utilizing sectorized base stations.

In general, the reference signal calculation module 248 applies the various inputs to construct an interference matrix. The interference matrix comprises vectors representing components of the signal path to be canceled. More particularly, the interference matrix includes interference vectors corresponding to the interfering Walsh code or codes, multiplied by the spreading code. Furthermore, for symbols included in an interfering channel having elements that overlap with a single symbol of interest, the values of those elements are included in the interference matrix. For elements of a symbol associated with an interfering channel that do not overlap the symbol of interest, the element values are not included in the interference matrix.

More particularly, consider a Walsh symbol of interest in which the boundaries of the interfering signal symbols do not align with the symbol boundaries of the symbol of interest. Let $S_{i,j}^L$ represent the interference vector for an interfering symbol having a left side (i.e. having one or more non-zero elements including at least a first element of the interfering symbol) overlapping the symbol of interest in signal path j, Walsh code i. The interference vector corresponds to the interfering Walsh code, multiplied by the spreading code and is nonzero for those elements of the interfering signal that overlap the symbol of interest. The remainder of elements in the interference vector that do not overlap the symbol of interest are not included in the interference vector. Consider a length N chip symbol of interest that is overlapped by two adjacent interfering symbols of length N chips from another multipath or base station. The interference signal can be represented as the two symbol sequence $s_1, s_2, \ldots, s_N, s_{N+1}, s_{N+2}, \ldots, s_{2N}$ in chips. The overlap occurs between the first chip of the symbol of interest at the kth chip, i.e. $s_k$, of the first overlapping interferer. However, in the special case where the interfering symbol and symbol of interest are aligned there is no need to separate the reference signal into left and right components. The interference vector corresponding to the left side overlap is given as:

$$s_{0,1}^L = \{s_{k+1}, s_{k+2}, \ldots, s_N, 0, 0, \ldots, 0\}$$

After the end of the first partial interfering symbol of interest, the remainder of the interference vector corresponding to the left side overlap is padded with zero elements so that the total number of elements is equal to the total number of chips comprising a symbol in the desired signal path. Similarly, for an interfering symbol having a right side (i.e. having one or more non-zero elements including at least a last element of this interfering symbol) overlapping the symbol of interest the interference vector corresponding to the right side overlap is given as:

$$s_{0,1}^R = \{0, 0, \ldots, 0, s_{N+1}, s_{N+2}, \ldots, s_{N+k}\}$$

The interference vectors are split into left and right halves since the two symbols that overlap the symbol of interest are modulated independently. Since the pilot channel is a non-information bearing channel and is only spread by the short code, it is not necessary to separate the reference signal into left and right halves. An interference vector corresponding to the pilot channel is given as:

$$s_{0,1} = \{s_{k+1}, s_{k+2}, \ldots, s_N, s_{N+1}, s_{N+2}, \ldots, s_{N+k}\}$$

Figure 3:
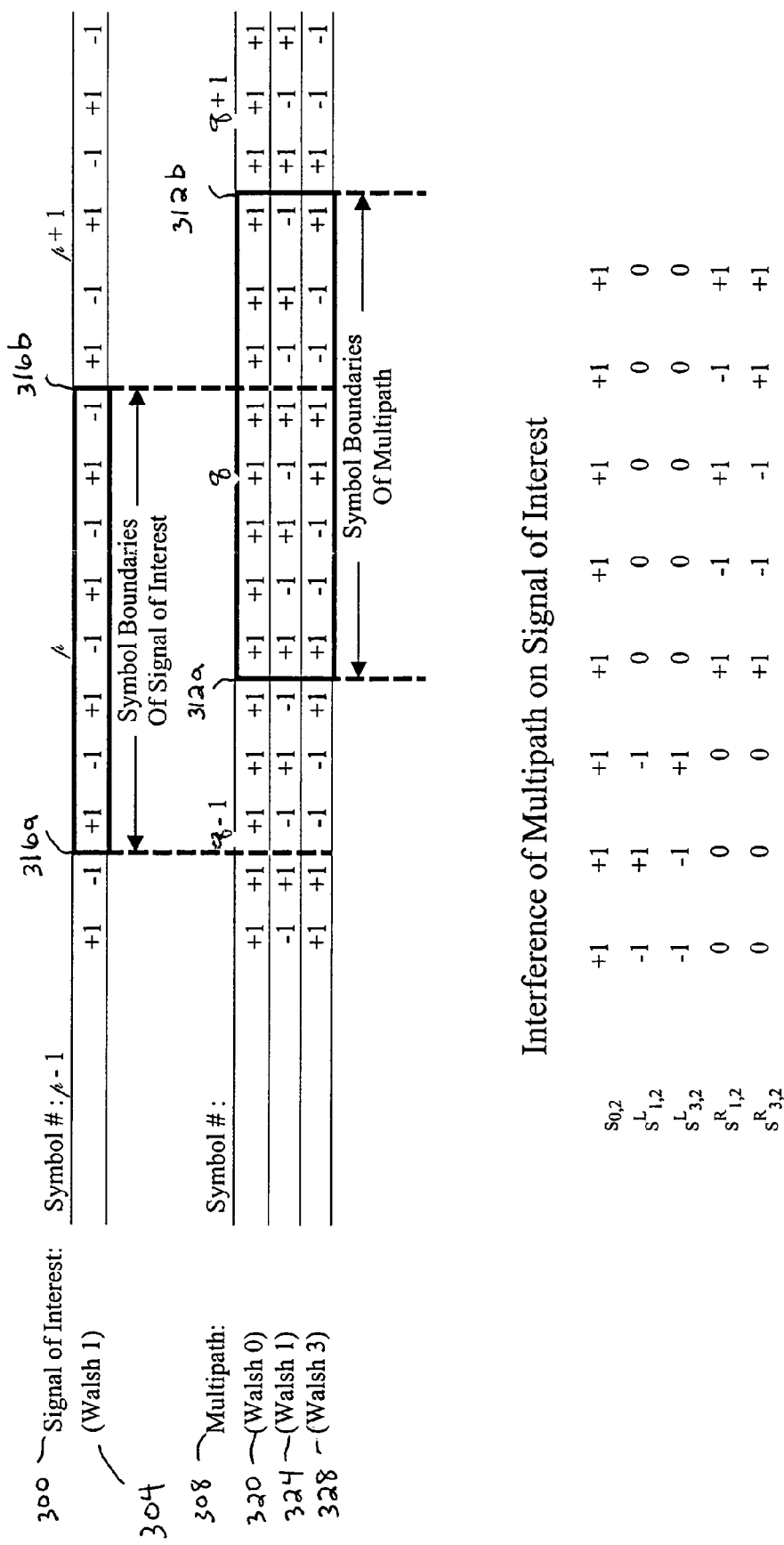
FIG. 3 is a depiction of the construction of interference reference signals based on symbol overlap.

FIG. 3 depicts a simplified example of the construction of the interference reference signals. The signals are short code despread and the Walsh codes are of length 8. It will be recognized by those skilled in the art that this example can be extended to Walsh codes of arbitrary length and will incorporate the spreading short code. Two signals are received, a signal path of interest 300 containing a channel to be demodulated 304 having a Walsh 1 covering code and an interfering multipath 308, delayed in time, such that the symbol boundaries 312a and 312b of the multipath 308 are not aligned with the symbol boundaries 316a and 316b of the symbol of interest 300. In this example, the interfering channels 320, 324, 328 use Walsh covering codes 0, 1 and 3. Since the first interfering channel 320 is the pilot channel (Walsh 0) and is not an information-bearing channel, the reference signal does not have to be separated into left and right halves, i.e. $u_{0,2}$ may be used. The symbols corresponding to Walsh codes 1 and 3 (i.e. channels 324 and 328) are modulated independently, so the reference signals for these channels 324, 328 must be separated into right and left halves. In particular, for each interfering channel to be cancelled, the symbol having elements including at least a last element that overlaps the symbol of interest has at least one non-zero element on a right side of the vector, and the symbol having at least a first element that overlaps the symbol of interest has at least one non-zero element at a left side (i.e. as a first element). The remainder of the elements in each half is then padded with zeros (i.e. those elements not overlapping an element of the symbol of interest are not included in the interference vector construction).

For communication systems that support supplemental channels, which use shorter length Walsh codes, the generation of interference reference signals for cancellation is a more complex procedure. As used herein, the term reference signal refers to a sequence of values that are replicas of the transmitted code. For example, a reference signal may comprise a signal modulated by a PN spreading code and/or a Walsh covering code. In particular, where an interfering signal path comprises symbols having shorter length Walsh codes than the symbols corresponding to the desired signal path, there are in general more than two overlapping or partial symbols per symbol of interest. For example, if the interfering supplemental channel is length 16 and the signal of interest is covered by a length 64 Walsh code, five reference signals will typically be needed to span the symbol of interest unless there is symbol boundary alignment, in which case the number of reference signals may be reduced by one. In particular, unless the symbol boundaries of symbols within the desired signal path are aligned with symbol boundaries within the interfering signal path, partial interfering symbols will overlap on either end of the symbol of interest, and three other (full)

symbols will be contained within the 64 chip symbol of interest. The remaining elements in the reference vectors will be zero padded.

Figure 4:
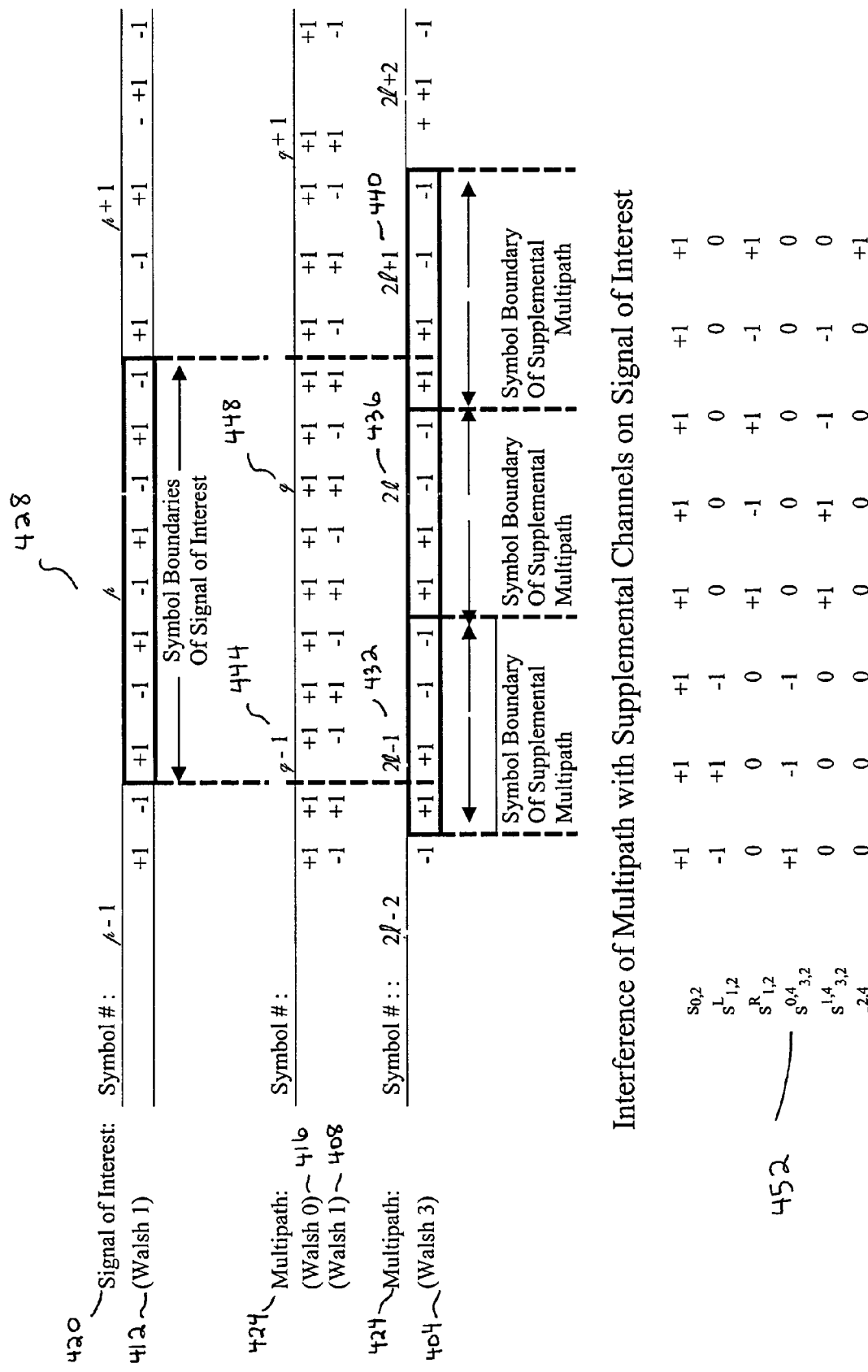
FIG. 4 is a depiction of the construction of interference reference signals based on symbol overlap of a supplemental channel.

FIG. 4 depicts a simplified example of the construction of the interference reference signals for a supplemental channel 404 (reference vectors $s^{0,4}_{3,2}$, $s^{1,4}_{3,2}$, $s^{2,4}_{3,2}$), in addition to interference reference signals for the interfering symbols for a channel 408 using symbols that are the same length as the symbol of interest 412 (reference vectors $s^L_{1,2}$ and $s^R_{1,2}$) and for the pilot channel 416 (reference vector $s_{0,2}$). The signals are short code despread and the Walsh codes are of length 8 for symbols in the desired signal path, length 4 for the supplemental (interfering) channel and length 8 for the remaining interfering channels. It will be recognized by those skilled in the art that this example can be extended to Walsh codes of arbitrary length. In this example, two signals are received, a signal path of interest 420, including a channel of interest 412 using a Walsh 1 covering code and an interfering multipath 424, delayed or shifted in time, such that the symbol boundaries are not aligned with the symbol boundaries of the signal path of interest 420. The interfering supplemental channel 404 shown is Walsh code 3 of length 4. Symbol p 428 of the signal of interest is overlapped by symbols 2*l*-1 432, 2*l* 436 and 2*l*+1 440 of the supplemental channel 404. In addition, the symbol of interest 428 is overlapped by symbols q-1 444 and q 448 of the interfering channel using a Walsh 1 covering code 408 and a symbol length of 8. Each symbol is independently modulated, so each symbol or partial symbol to be canceled from each symbol of interest is contained within a separate reference signal. The notion $s^{n,m}_{i,j}$ represents the nth symbol of length m overlapping the symbol of interest, signal path j, Walsh symbol i. The other elements in each reference vector are padded with zeros appropriately. As noted above, the set of interference reference signals illustrated in FIG. 4 includes Walsh codes 1 and 3 of length 8, as depicted in FIG. 3. Accordingly, the interference matrix S 452 for the example given in FIG. 4 includes a single vector $s_{0,2}$ for the pilot channel 416, two interference vectors $s^L_{1,2}$ and $s^R_{1,2}$ for the interfering channel 408 using length 8 symbols, and three vectors $s^{0,4}_{3,2}$, $s^{1,4}_{3,2}$, and $s^{2,4}_{3,2}$ for the supplemental interfering channel 404.

The interference vector set for each interfering channel and the single interference vector for the pilot to be cancelled, form the interference matrix S. The projection operator that projects a reference vector onto a subspace orthogonal to the space spanned by the vectors of the interference matrix S is given as:

$$P_s^\perp = I - S(S^T S)^{-1} S^T$$

where I is the identity matrix. The projection operator is independent of interference vector magnitude and completely suppresses the interference that lies in the space spanned by the set of vectors s that comprise the matrix S. The projection operator can be applied to the reference signal, which is a replica of the signal of interest to be demodulated, in order to completely suppress the interference in the correlator. When the reference signal with the interference removed is applied to the data, only contributions in the received signal orthogonal to the interference will be detected.

The grammian term $S^T S$ is a square matrix, whose dimension is equal to the number of interference vectors that are included in S. One may perform the full inverse of the matrix, or if the matrix is less than full rank, a pseudo inverse may be performed. Approximations to the inverse may reduce computational complexity, but may not provide comparable precision to the full matrix inverse. Matrix inversions can be computationally simplified using QR methods, such as Householder, Givens and Gram-Schmidt methods. The QR methods may be used to decompose a given matrix into an orthonormal basis. For matrix inversions in a projective subspace apparatus, the normalization step is unnecessary and adds an additional computational step.

A method for orthogonalizing without the unnecessary normalization step in signal processing applications is put forth in pending U.S. patent application Ser. No. 09/988,219, filed Nov. 19, 2001, entitled "A Method and Apparatus for Implementing Projections in Signal Processing Applications," assigned to the assignee of the present invention, the entire disclosure of which is hereby incorporated by reference. It provides a method for calculating the $(S^T S)^{-1}$ inverse Grammian term without the need for matrix inversions or square root computations. Approximate methods, as put forth in prior art, can be useful in simplifying the computation, such as $$P_s^\perp x = x - \sum_{j=1}^{p} \frac{\langle s_j, x \rangle}{\|s_j\|^2} s_j$$

However, such simplifications may result in an unacceptable loss of accuracy since the basis is not orthogonal and it does not take into account the cross-correlation properties of the interference vectors.

The S matrix is composed of r vectors, i.e. $s_1, s_2, \ldots, s_r$. The projection operator is constructed in the following steps:

A. Assign $s_1$ as a first basis vector $u_1$;
B. Determine $\sigma_t$, where $u_t^T u_t = \sigma_t$; and
C. Store $u_t$;
D. Compute the inner products of $s_{t+1}$, and vectors $u_1$ through $u_t$ by utilizing a multiply-add-accumulator (MAC) t times;
E. Multiply the inner product with the respective scalar $1/\sigma_t$ and thereby creating the first intermediate product;
F. Scale each respective basis vector $u_t$ by multiplying each respective first intermediate product with each respective basis vector $u_t$;
G. Obtain the vector sum from step F;
H. Subtract the vector sum from $s_{t+1}$, to obtain the next basis vector $u_{t+1}$;
I. Compare $u_{t+1}$ to a predetermined value and if equal to or less than the value, go to step N;
J. Store $u_{t+1}$;
K. Determine an inner product of $u_{t+1}^T u_{t+1}$;
L. Determine the reciprocal of step K which is $1/\sigma_{t+1}$;
M. Store $1/\sigma_{t+1}$;
N. Increment t;
O. Repeat steps D through N until all the s vectors have been processed, when t=r and r is the total number of spread signal s vectors of interest; and
P. Determining $P_s^\perp$ where: $P_s^\perp = I - U(U^T U)^{-1} U^T$.
Q. Apply $P_s^\perp$ to the reference signal x, i.e. $P_s^\perp x = x - U(U^T U)^{-1} U^T x$.

Since the PN spreading code, for example the short code, is much longer than the symbol length and only repeats every 512 symbols, the interference cancellation has to be performed for each symbol since the interference is time varying.

Figure 5:
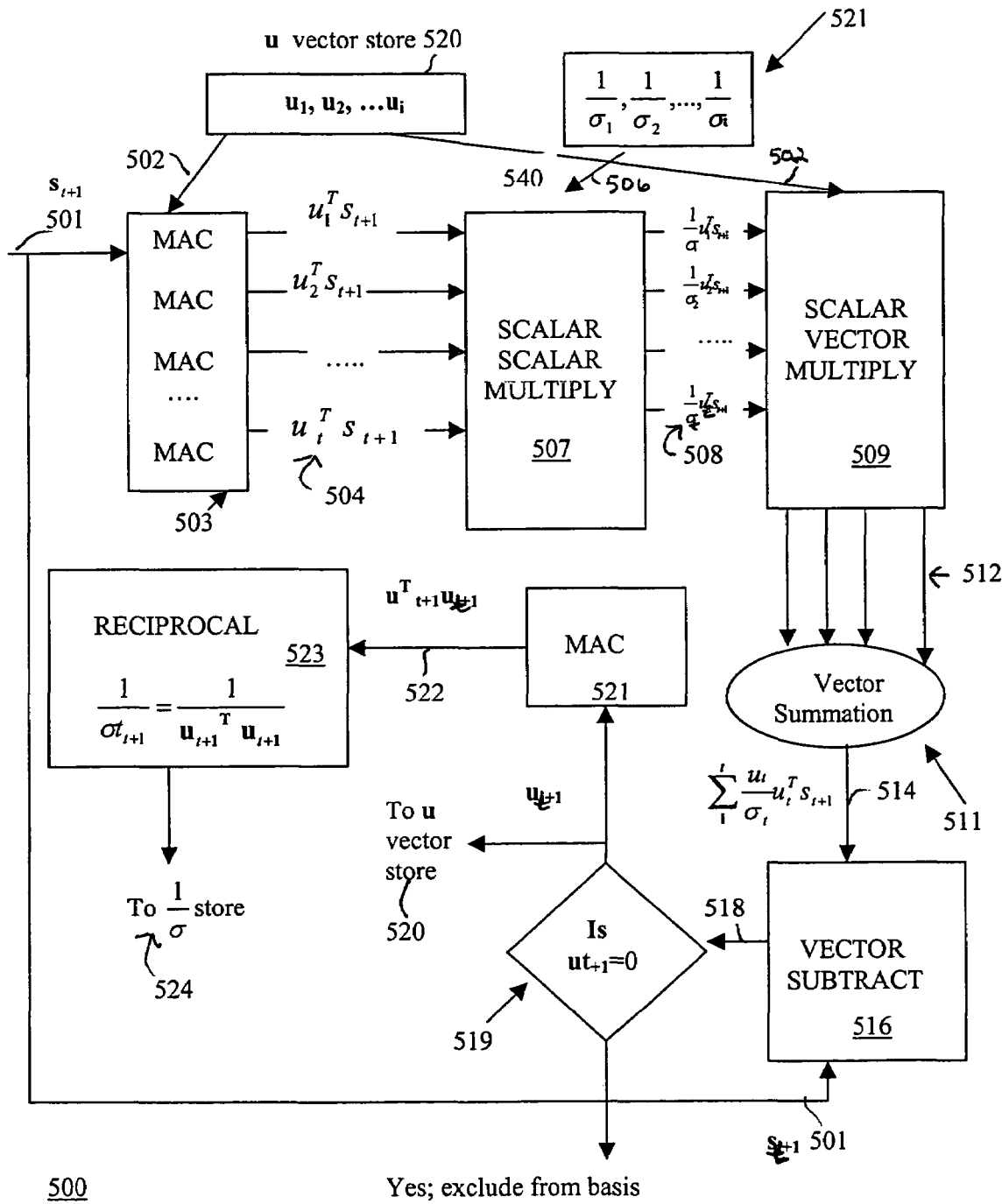
FIG. 5 is a depiction of the apparatus for the orthogonalization of a matrix.

The data flow associated with the process of orthogonalization without the unnecessary normalization step is depicted in FIG. 5. The inner product of the t+1th interference vector 501 and all t orthogonalized vectors 502 in the vector store 520 are performed in the MACs in 503. The vector store 520 contains the t-dimensional basis computed thus far for the present symbol. The resulting scalar 504 is multiplied in 507 by the t scalars 506 to form an intermediate product. The intermediate product is multiplied by the orthogonalized vectors 502 in scalar vector multiply block 509 to form a set of t scaled vectors 512. The set oft scaled vectors are summed element-wise in summation block 511 to form a composite vector 514. The vector sum 514 is subtracted from the t+1th reference signal 501 in vector subtraction block 516. In block 519 a determination is made as to whether the difference 518 output by the vector subtraction block 516 is equal to the zero vector. If the resulting difference 518 is equal to the zero vector or if it is less than a predetermined metric it is excluded from the basis. Otherwise, it is added to the vector store 520 and sent to a MAC 521 where the square of the magnitude is calculated 522. The reciprocal is computed in 523 and is stored in 524.

Figure 6:
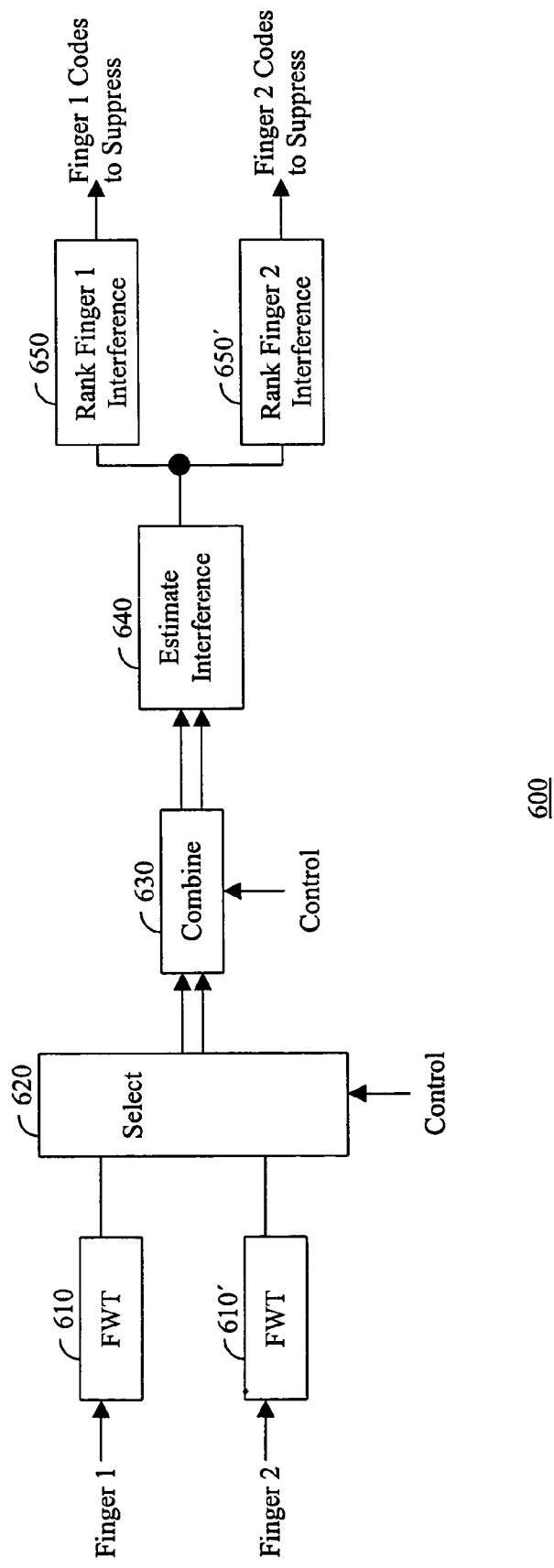
FIG. 6 is a depiction of the channel determination and ranking circuit of FIG. 1.

In FIG. 6, an apparatus is depicted that ranks interference and determines which interference vectors are included in the construction of the interference matrix. The interference ranking circuit includes a plurality of Fast Walsh Transform (FWT) operators 610 and 610', a selector 620, a combiner 630, an estimate block 640 and a ranking circuit 650 and 650'. In the illustrated embodiment, the plurality of FWT operators includes one FWT operator per demodulation finger of the RAKE receiver. In other embodiments, the FWT operators may be shared among the RAKE fingers. The FWT operators produce an indication of which channels are present in a received DS-CDMA signal. The FWT operators essentially correlate the despread signal produced by the despreader against all possible Walsh code symbols that may have been broadcast by the transmitter. For certain cdma2000 embodiments, this is inclusive of quasi-orthogonal functions (QOFs). The indication of which channels are present may also include an indication of received signal strength or of signal energy.

According to an embodiment of the present invention, the Fast Walsh Transform (FWT) method is used in a novel manner to perform additional operations of channel estimation, comparison of the channel amplitude with a pre-determined threshold, and the use of certain channels to construct an interference matrix for use in subsequent interference cancellation operations for all Walsh code lengths. The process begins with the shorter Walsh codes (supplemental channels) and searches for longer Walsh codes in the same family if the shorter ones have not been determined to be present. Such a Fast Walsh Transform method is described in U.S. patent application Ser. No. 10/686,829, filed Oct. 15, 2003, entitled "Method and Apparatus for Channel Amplitude Estimation and Interference Vector Construction", and U.S. Provisional Application Ser. No. 60/418,187, filed Oct. 15, 2002, which are assigned to the assignee of the present invention, the entire disclosures of which are incorporated herein by reference.

Figure 7:
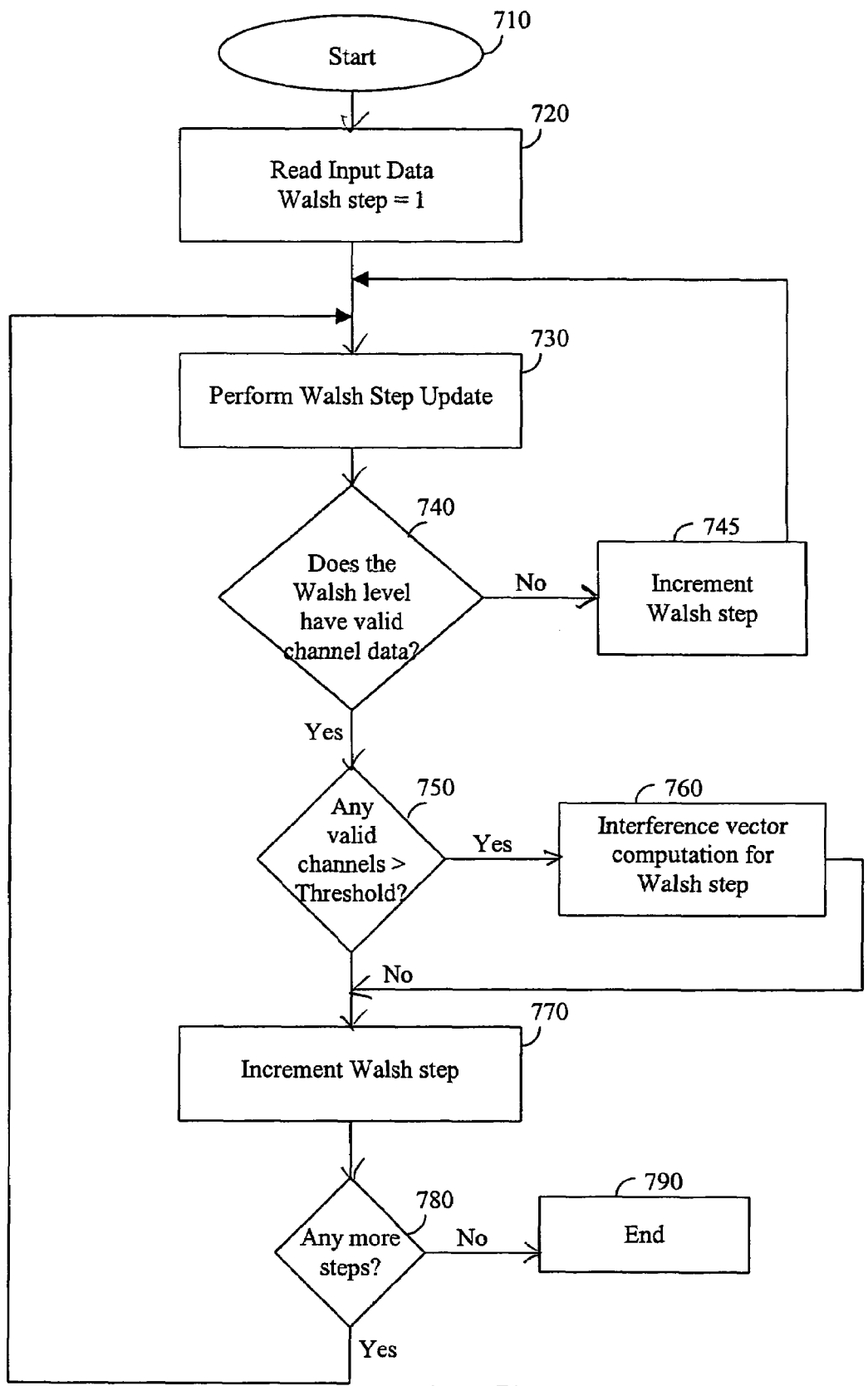
FIG. 7 is a depiction of the process flow of the Fast Walsh Transform (FWT)

FIG. 7 illustrates the steps involved in implementing the FWT. The apparatus uses short code despread and phase stripped data as inputs in step 720 and performs Fast Walsh step update 730 on the data. The process begins with the shortest allowed Walsh codes and increases level by level to longer codes. If the Walsh step leads to a vector with valid channel data in 740 (for example, in Radio Configurations 3 and 4 in cdma2000, it is checked against a threshold in step 750). The Walsh level is then incremented 770, and the process repeats until step 780 reveals that there are no more valid Walsh levels as specified by the maximum symbol length in the standard. Once an active Walsh code is found, all other longer Walsh codes in the same family are disallowed. Moreover, certain Walsh families or Walsh codes are disallowed due to orthogonality requirements or correspond to reserved channels.

The selector 620 selects which FWT operator 610 and 610' outputs to combine in the combiner 630. The selector 620 is controlled by a control signal received as an input from the cancellation controller 190. In accordance with the present invention, some demodulation fingers 124 of the RAKE receiver circuit may be assigned solely for the purpose of measuring interference parameters. One or more fingers may be assigned to base stations with which the mobile unit is in soft hand-off. Moreover, one or more fingers may be assigned to base stations with which the mobile unit is not in soft hand-off for the purpose of measuring interference. If two or more fingers are assigned to the same sector, the selector 620 selects those two or more fingers and provides them together to the combiner 630 so that they may be combined to give the best estimate of traffic channels present and channel strength.

After the channels have been combined, if necessary, the indications of channels present are provided to the estimate block 640. The estimate block 640 forms an estimate of the channels present at each finger and provides the estimate to the ranking circuit 650 and 650'. The ranking circuit 650 and 650' ranks the channels according to a predetermined criteria. The ranking circuit includes a first finger ranking circuit 650 and a second ranking circuit 650'. It will be obvious to those skilled in the art, that the number of ranking circuits may be arbitrarily increased. Ranking is done because not all interference should be suppressed. A tradeoff exists between the amount of interference suppressed and the amount of signal energy lost of the signal of interest.

For a particular finger, the strength or weight assigned to each interference vector is typically proportional to the following: (i) the amount by which the interference vector overlaps with the symbol interval of the finger under consideration; and (ii) the magnitude of the interference vector. An interference vector is a particular Walsh code corresponding to a particular base station and delay. Any suitable process may be used to rank the interference, and any other suitable parameters may be used for ranking. In the preferred embodiment, interference ranking is applied separately for each receiver circuit or receiver finger assigned to multipath from sectors in soft handoff with the mobile unit.

The ranking circuit produces a set of codes to suppress. The codes to suppress are interference vectors selected from the ranked interference list for the given finger. In the illustrated embodiment, the interference vectors are partially overlapping spread Walsh codes from this base station sector and other base station sectors. In these embodiments, a spread Walsh code refers to a Walsh code multiplied by a PN spreading sequence. The codes to suppress are provided by the ranking circuit 650 to an orthogonal projection calculator 248 associated with an appropriate finger.

The orthogonal projection calculator 248, in response to the codes or interference vectors to suppress and the desired Walsh code and short code sequence, calculates an orthogonal projection of the desired spread Walsh code relative to the selected set of interference vectors. In the illustrated DS-CDMA embodiment, the desired code is the assigned Walsh code for the finger multiplied by the appropriate PN spreading sequence. After calculation of the orthogonal projection of the desired spread Walsh code, the finger uses the resulting orthogonal projection reference signal (rather than the desired code or Walsh code itself) in its correlator 228. The orthogonal projection reference signal is provided to the traffic despreader. The traffic despreader despreads received chip data by applying the orthogonal projection reference signal as a despreading code. The summer 240 sums a predetermined number of chips of despread data, i.e. corresponding to the length of the symbol of interest, which is provided to the controller as demodulated data. By taking the projection of the Walsh code orthogonal to the interference, the designated interference is completely suppressed.

Figure 8:
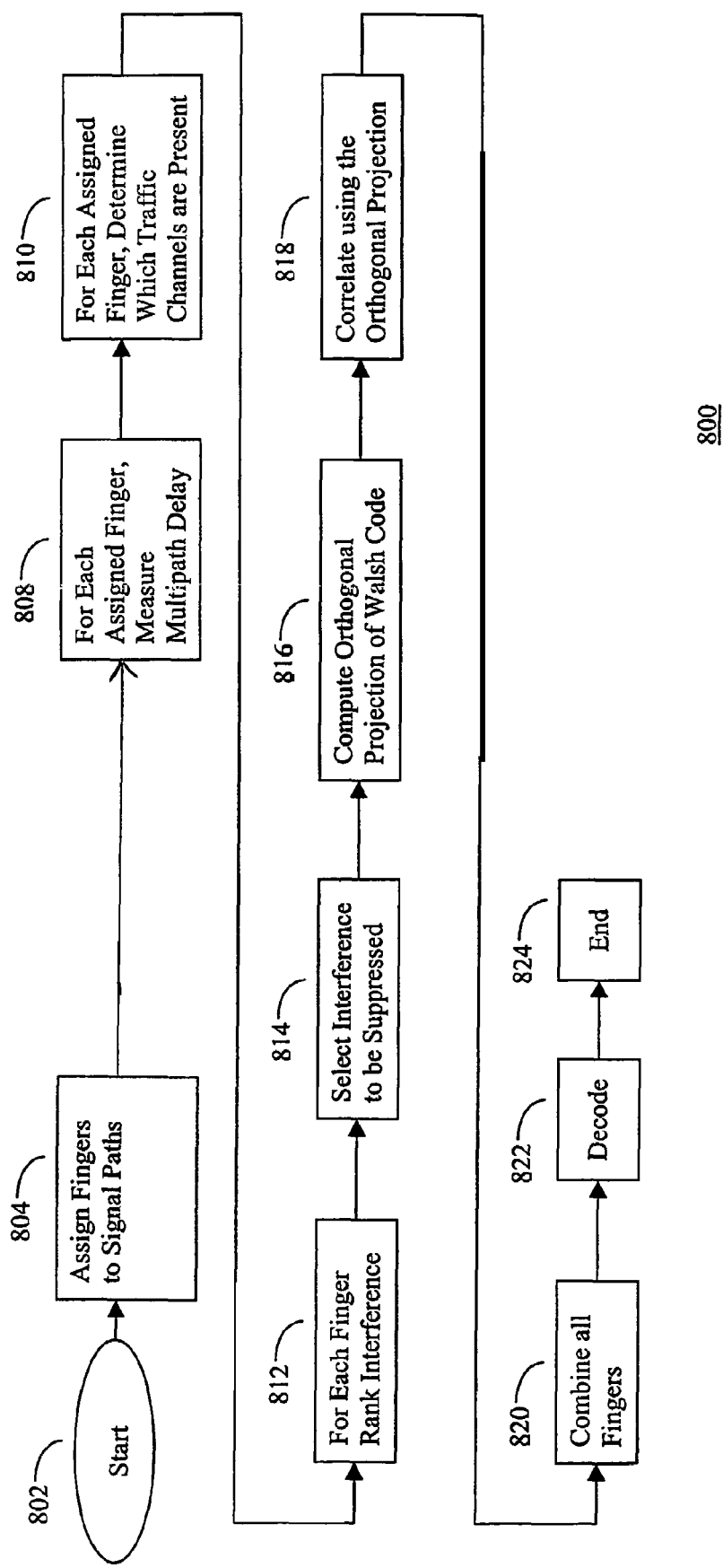
FIG. 8 is a depiction of the process flow of the interference cancellation-enabled enabled receiver in FIG. 1.

Referring to FIG. 8, a flow diagram illustrates a method for operating a communication device such as the receiver 100 depicted in FIG. 1 according to an embodiment of the present invention. The method 800 begins at step 802.

At step 804, fingers or other receiver circuits are each assigned to a signal path. Generally, all available fingers may be assigned and not left idle. Furthermore, the fingers may be used for combining multipath versions of a desired signal path or are used to identify interference associated with other signal paths. Each receiver circuit is assigned to one multipath element. At step 808, for each assigned finger, the multipath delay is measured. At step 810, it is determined which traffic channels are present at each assigned finger. The Fast Walsh Transform (FWT) is a suitable method for accomplishing this.

The method continues at step 812, where the interference is ranked for each finger. A list of interference is prepared, ranked by amplitude of the interference, the overlap with the symbol interval, or any other predetermined criteria. In the illustrated embodiment, the amplitude of the interference is used for ranking. The different traffic channels from a sector will have different amplitudes. Preferably, a list of interference is prepared for each finger, ranking the different interference received by the finger. Alternatively, a single list of all interference may be prepared, or multiple lists associated with different fingers. In the illustrated embodiment, the Walsh codes corresponding to the multipath are ranked. The ranked lists of interference are typically stored in memory in the RAKE receiver or in the controller or any other suitable location. Thus, at each receiver circuit, interference vectors or codes are ranked according to predetermined criteria.

At step 814, the interference to be suppressed is selected using the ranked lists of interference. Selection may be made using any suitable criteria. For example, the top five interference vectors from each finger's list may be selected, or the top twenty of all ranked interference vectors may be selected, or according to some other selection criteria. Moreover, if the symbol overlap is quite asymmetric then it may also be possible to only include the partial interference vectors with less zero padding then the complementary set with more zero padding to reduce the matrix rank. For the case of supplemental channels (short Walsh codes), it may be possible to only include the full symbols and exclude the partial symbols resulting from overlap. Since the number of reference signals for supplemental channels, with short Walsh codes, can be much greater than the number of interfering signals ranking is important. For example, to cancel a length 4 Walsh code from a 64 length Walsh code, there will be 16 reference signals if the symbols are aligned to boundaries or 17 with misalignment. Since the 2 partial symbols of the 17 symbols will only partially overlap, it may be useful to exclude them and use the resulting 15 for the construction of the interference matrix. Note that there is a balance between suppressing the interference and canceling too much of the signal of interest. The selected interference vectors are provided as codes to be suppressed.

Using the selected interference vectors, the orthogonal projection of the desired code or assigned spread Walsh code is calculated, step 816. The orthogonal projection is orthogonal to all of the selected interferers. At step 818, the received data is correlated or despread using the calculated orthogonal projection and summed. By using the orthogonal projection, all interference corresponding to the selected interference vectors is completely suppressed. Preferably, step 816 and step 818 are performed on a finger-by-finger basis, with correlation being performed independently at each finger to suppress interference at that finger.

At step 820, the demodulated data estimates from the fingers assigned to multipath from sectors in soft handoff are combined, and at step 822 the transmitted symbol is decoded for further processing. Thus, data estimates from the individual fingers, improved by interference suppression, are combined to form received signals. The method ends at step 824, but may resume again for error suppression, detection and decoding of a subsequent symbol.

Although the description provided herein has at times used examples of receivers comprising cellular telephones in spread spectrum systems, it should be appreciated that the present invention is not so limited. In particular, the present invention may be applied to any wireless communication system component implementing a wireless link or channel capable of using a plurality of channels simultaneously. Accordingly, the present invention may be used in both mobile devices, such as telephones or other communication endpoints, or in wireless base stations or nodes. Furthermore, the present invention is not limited to terrestrial applications. For example, the present invention may be used in connection with satellite communication systems. In addition, the present invention is not limited to voice communication systems. For example, embodiments of the present invention may be applied to any multiple channel system, including radio locating systems, such as the global positioning system (GPS), multi-media communications, and data transmission systems.

The foregoing discussion of the invention has been presented for purposes of illustration and description. Further, the description is not intended to limit the invention to the form disclosed herein. Consequently, variations and modifications commensurate with the above teachings, within the skill and knowledge of the relevant art, are within the scope of the present invention. The embodiments described hereinabove are further intended to explain the best mode presently known of practicing the invention and to enable others skilled in the art to utilize the invention in such or in other embodiments and with various modifications required by their particular application or use of the invention. It is intended that the appended claims be construed to include the alternative embodiments to the extent permitted by the prior art.

What is claimed is:

1. A method for interference suppression, the method comprising:

receiving as part of a signal stream in a receiver a desired signal path having symbols of a first length;

receiving as part of said signal stream in the receiver an interfering signal path having symbols of a second length, wherein said second length is less than said first length; and forming an interference matrix in a cancellation controller having at least three interference vectors, wherein a first of said interference vectors includes a representation of at least a portion of a first interfering symbol included in said interfering signal path, wherein a last of said interference vectors comprises a representation of at least a portion of a second symbol included in said interfering signal path, and wherein an intermediate one of said interference vectors comprises a representation of all of a third symbol included in said interfering signal path;

where the interference matrix is used to substantially reduce interference from the signal stream.

2. The method of claim 1, wherein said interference vectors are time-aligned with one another.

3. The method of claim 1, wherein said first length is an integer multiple of said second length.

4. The method of claim 1, wherein said interference matrix comprises a plurality of intermediate interference vectors.

5. The method of claim 1, wherein said interference vectors comprise a number of elements equal to a number of chips in said symbol of said first length.

6. The method of claim 1, wherein for a said second length being equal to x elements, and said first interference vector comprising y non-zero elements, said last column comprises x-y non-zero elements.

7. The method of claim 1, wherein said symbol length is measured in chips, and wherein said intermediate interference vector comprises a number of non-zero elements equal to a number of chips in said symbols of said second length.

8. The method of claim 1, wherein said symbol length is measured in chips, and wherein said interference matrix comprises a plurality of intermediate vectors, and wherein each of said intermediate vectors comprises a number of non-zero values equal to a number of chips in said symbols of said second length.

9. The method of claim 1, wherein each of said interference vectors of said interference matrix comprises at least one zero value.

10. The method of claim 1, wherein each of said interference vectors of said interference matrix comprises at least a number of zero values equal to said first length minus a number of chips comprising said second length.

11. The method of claim 1, wherein said interference matrix is used in calculating a projection of a reference signal that is orthogonal to said interfering signal path.

12. The method of claim 1, wherein said first, second, and third interfering symbols are associated with a first channel, and wherein said interference matrix comprises at least a fourth interference vector comprising a representation of at least a portion of an interfering symbol associated with a second channel.

13. The method of claim 1, wherein said computational component is implemented in one of a mobile device or a wireless base station.

14. The method of claim 1, wherein said computational component comprises a logic circuit.

15. A method for suppressing interference, comprising:
identifying an interfering signal in a searcher;
tracking said interfering signal in a finger;
for at least a first channel included in said interfering signal, building an estimate in a cancellation controller of at least a portion of each symbol of said interfering signal that overlaps with a symbol of interest, wherein at least three symbols of the first channel of said interfering signal at least partially overlap said signal of interest; and
forming an interference matrix in the cancellation controller comprising said estimate of at least a portion of each symbol of said interfering signal that overlaps with a symbol of interest;
where the interference matrix is used to substantially reduce interference contributed by the said interfering signal.

16. The method of claim 15, further comprising:
forming a projection, wherein said at least a first channel included in said interfering signal is removed from a received signal to form an interference canceled despread signal stream.

17. The method of claim 15, wherein said interference matrix comprises a plurality of vectors, said vectors each representing at least a portion of an interfering symbol.

18. The method of claim 15, wherein said interference matrix comprises at least one vector for each of said symbols of said interfering signal that overlaps with said symbol of interest.

19. The method of claim 18, further comprising:
forming a modified interference matrix, wherein at least one vector of said interference matrix is omitted.

20. The method of claim 18, wherein said interference matrix comprises a number of intermediate interference vectors, said method further comprising:
forming a modified interference matrix including a subset of said number of intermediate interference vectors.

21. An apparatus for canceling an interfering channel from a signal path, comprising:
a first demodulation finger, wherein a first desired signal path is tracked;
a second demodulation finger, wherein a first interfering signal path is tracked; and
a cancellation controller, operable to form an interference matrix comprising at least a first interference vector, an intermediate interference vector, and a last interference vector, wherein said first and last interference vectors each correspond to a partial interfering symbol included in a first channel of said interfering signal path, wherein said intermediate interference vector contains a number of non-zero values corresponding to a complete interfering symbol included in said first channel of said interfering signal path.

22. The apparatus of claim 21, further comprising:
a orthogonal reference signal calculation module, wherein said interference matrix is combined with a reference signal that includes short code associated with said desired signal path and a Walsh covering code associated with a desired channel to create the orthogonal reference signal.

23. The apparatus of claim 21, further comprising:
a signal multiplier, wherein said orthogonal reference signal is combined with a received signal to produce a despread and decovered, interference canceled signal stream.

24. The apparatus of claim 21, further comprising:
a summer, wherein said demodulated symbol of interest is obtained from said despread and decovered interference canceled signal stream.

25. An apparatus for a signal stream including suppression interference from a signal, comprising:
means for receiving a desired signal path and an interfering signal path;
means for detecting an active channel in said interfering signal path;
means for forming at least three interference vectors for each portion of a symbol in said interfering symbol path that overlaps with a desired signal; and
means for calculating a projection of a reference signal that is orthogonal to a matrix of vectors comprising said at least three interference vectors.

26. The apparatus of claim 25, further comprising:

means for recovering a desired symbol from said received signal stream when combined with said orthogonal reference signal.

27. A method for canceling interference, comprising:

receiving as part of a signal stream a desired signal path in a receiver;

receiving as part of said signal stream an interfering signal path in a receiver;

identifying in a cancellation controller at least a first active channel in said interfering signal path by:

1) obtaining a first number of chip values from said interfering signal stream, wherein said first number is equal to a number of chips included in a longest valid symbol;

2) performing a fast Walsh transform on said first number of chip values to obtain a first set of transformed values, wherein a first result includes a first number of elements equal to said first number of chip values;

3) comparing a value of each of said first number of elements of said first set of transformed values to a threshold; and 4) creating a modified set of values, wherein for each element of said first set of transformed values:

a) in response to a first result of said comparison, a value of said element is changed to a zero;

b) in response to a second result of said comparison, a value of said element is not changed to zero;

forming an interference matrix in the cancellation controller comprising a plurality of interference vectors, wherein at least a first of said interference vectors comprises at least a portion of a first interfering symbol included in said identified at least a first channel of said interfering signal path and wherein a second of said interference vectors comprises at least a portion of a second symbol included in said at least a first channel of said interfering signal path;

where the interference matrix is used to substantially reduce interference from the signal stream.

28. The method of claim 27, further comprising:

forming a projection operator, wherein a reference vector is projected onto a subspace orthogonal to the space spanned by said vectors of said interference matrix.

29. The method of claim 28, wherein said forming a projection operator includes determining $P_s^\perp$ where: $P_s^\perp = I - U(U^T U)^{-1} U^T$, where I is the identity matrix and where the vectors of the interference matrix U form an orthogonal basis.

30. A method for canceling interference, comprising:

receiving as part of a signal stream a desired signal in a receiver;

receiving as part of said signal stream an interfering signal path in the receiver;

identifying at least a first active channel in said interfering signal path in a cancellation controller;

forming an interference matrix in the cancellation controller comprising a plurality of interference vectors, wherein at least a first of said interference vectors comprises at least a portion of a first interfering symbol included in said identified at least a first channel of said interfering signal path and wherein a second of said interference vectors comprises at least a portion of a second symbol included in said at least a first channel of said interfering signal path;

determining in the cancellation controller a projection operator $P_s^\perp$ where: $P_s^\perp = I - U(U^T U)^{-1} U^T$, where I is the identity matrix and where the vectors of the interference matrix U form an orthogonal basis; and applying said projection operator to a reference signal.

* * * * *